F. J. CLARK.
CLOTH CUTTING MACHINE.
APPLICATION FILED APR. 10, 1915.
1,197,794.
Patented Sept. 12, 1916.
3 SHEETS—SHEET 1.
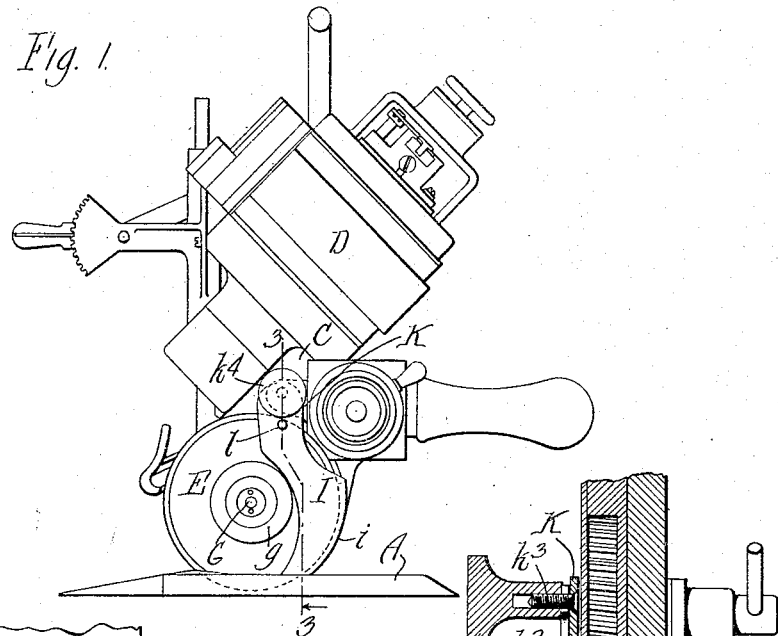

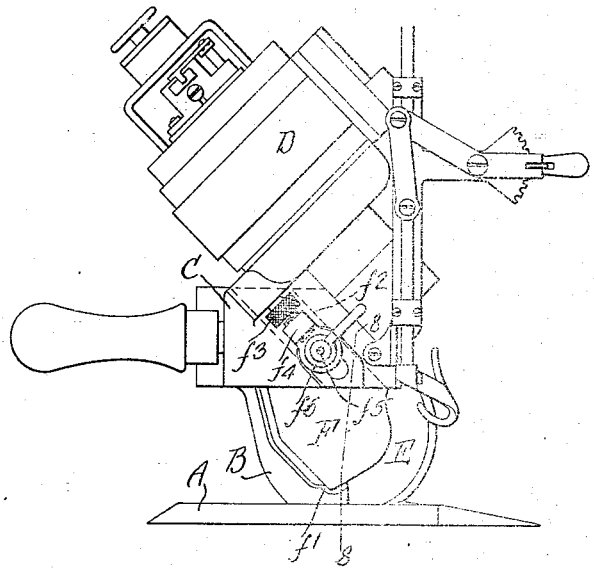
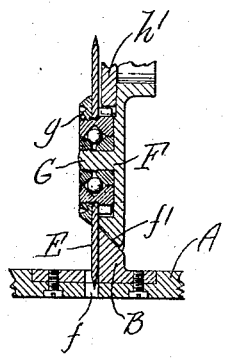
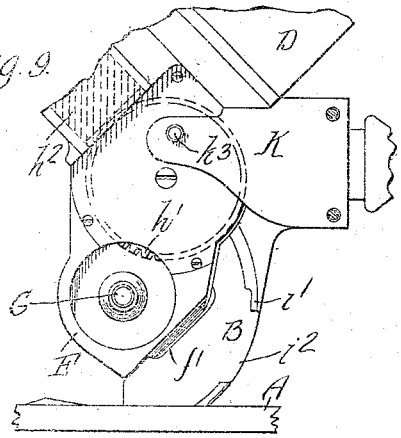

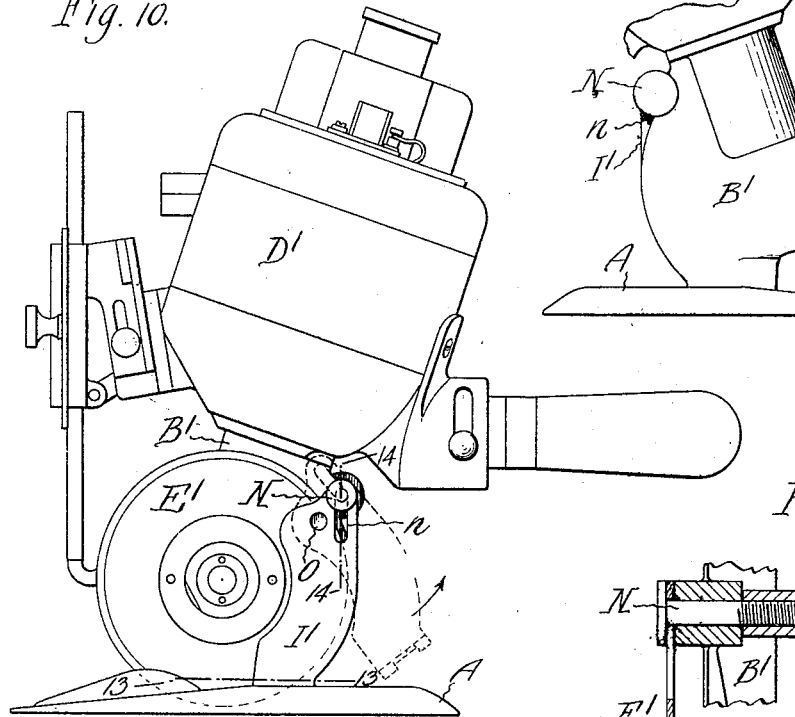
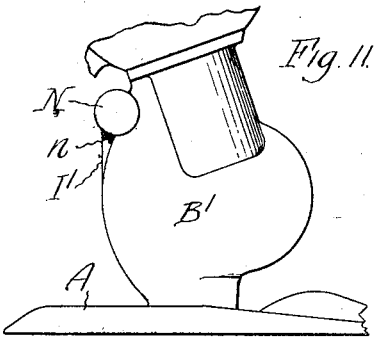
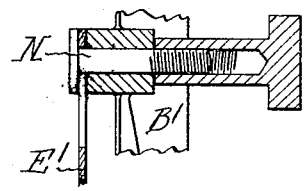
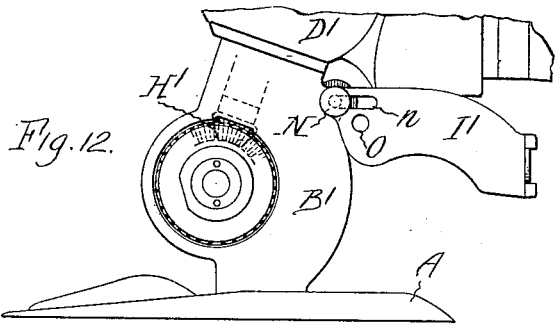
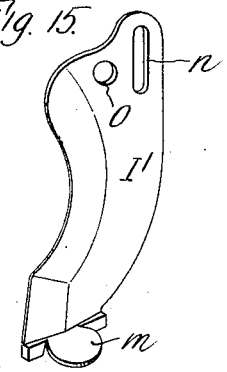
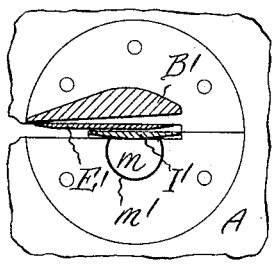

UNITED STATES PATENT OFFICE.

FREDERICK J. CLARK, OF BUFFALO, NEW YORK, ASSIGNOR TO EASTMAN MACHINE COMPANY, OF BUFFALO, NEW YORK.

CLOTH-CUTTING MACHINE.

1,197,794.  Specification of Letters Patent.  Patented Sept. 12, 1916.

Application filed April 10, 1915. Serial No. 20,434.

*To all whom it may concern:*

Be it known that I, FREDERICK J. CLARK, a citizen of the United States, residing at Buffalo, in the county of Erie and State of New York, have invented a new and useful Improvement in Cloth-Cutting Machines, of which the following is a specification.

This invention relates to improvements in portable cloth cutting machines of that type which comprises a carriage or base which is adapted to rest upon and be moved freely about on a cutting table or supporting surface, and a rotary cutting knife which is driven by a motor on the carriage. These machines have a flat base which is adapted to be moved on the supporting surface beneath the pile of cloth to be cut, and a slender standard which rises from said base and supports the knife and the driving motor and connections therefor. It is desirable in these machines to have the knife mounted at one side of the supporting standard so that it can be readily removed from the machine. In some machines the knife is mounted so that it can be adjusted toward the base as its diameter is reduced by wear or sharpening, in order to maintain the proper cutting relation between the knife and the base, while in other machines the knife is not adjustable. This invention is applicable to machines of both kinds.

The objects of the invention are to provide a guard for the rear edge portion of the knife at the side thereof opposite to the supporting standard which will protect the hands of the operator and prevent the cloth from pressing against and being cut by this portion of the knife, thereby reducing the friction on the knife and increasing the efficiency of the machine, and which can be readily detached or shifted so as not to interfere with the ready removal and replacing of the knife.

The drawings illustrate the invention as applied to both the adjustable and non-adjustable knife machines.

Figure 1 is a side elevation of an adjustable knife cloth cutting machine embodying the invention. Fig. 2 is a fragmentary rear elevation thereof. Fig. 3 is an enlarged sectional elevation thereof on line 3—3, Fig. 1. Fig. 4 is a detached perspective view of the guard. Fig. 5 is a detail of the securing means for the upper end of the guard. Fig. 6 is a fragmentary plan view of the machine, partly in section, on line 6—6, Fig. 3. Fig. 7 is an elevation of the machine as seen from the side opposite to that shown in Fig. 1. Fig. 8 is a sectional elevation on line 8—8, Fig. 7. Fig. 9 is a fragmentary side elevation with the knife and guard removed. Fig. 10 is a view similar to Fig. 1, showing a slightly modified guard applied to a machine having a non-adjustable knife. Fig. 11 is a fragmentary elevation of the opposite side thereof. Fig. 12 is a fragmentary side elevation thereof with the knife removed and the guard in its raised inoperative position. Fig. 13 is a fragmentary plan view thereof, partly in section, on line 13—13, Fig. 10. Fig. 14 is an enlarged sectional elevation on line 14—14, Fig. 10. Fig. 15 is an enlarged perspective view of the guard detached.

Referring first to Figs. 1–9, which illustrate an adjustable knife machine, the machine comprises a flat base A which is adapted to rest on and be moved about on a cutting table or supporting surface beneath the pile of cloth to be cut, a standard B which rises from said base, a suitable frame C, supported by the standard, in which an electric motor D is mounted, and a circular disk knife E which is rotatably mounted at one side of the standard B and is connected by suitable drive gearing with the armature shaft of the motor. The knife is journaled on a vertical plate or knife-carrier F which is slidably arranged edgewise in front of the standard B and is mounted so as to permit the knife to be adjusted toward and from the base at an inclination to the plane of the base. As the diameter of the knife becomes smaller, due to wear or sharpening, it may thus be adjusted downwardly and forwardly to bring the cutting edge of the knife into proper cutting relation to the knife slot $f$ in the base, into which slot the lower portion of the knife extends. As shown, the knife-carrier plate F is slidably confined and guided in upwardly and rearwardly inclined guides $f'$ on the standard B and $f^2$ on the frame C on the upper end of the standard, and is adapted to be adjusted by a screw $f^3$ connecting the frame C with the nut or threaded part $f^4$ engaging a screw stud $f^5$ which extends from the knife-carrier plate F through an inclined slot in the frame. A clamping nut $f^6$ on the screw stud $f^5$ is adapted to clamp the knife-carrier plate against the frame for rigidly securing the same when adjusted. The knife is located at one side of the standard and the knife-carrier plate F and may be rotatably mounted on the latter in any suitable manner which enables the ready removal of the knife. For instance, the knife turns on a ball bearing surrounding a stud G projecting laterally from the knife-carrier plate F and can be easily removed sidewise from the stud by first unscrewing a lock nut $g$. The knife is driven by gearing comprising a spiral toothed pinion secured to the inner side of the knife and meshing with a spiral toothed gear wheel $h'$ which is journaled on the knife-carrier plate F and meshes with a spiral pinion $h^2$ on the armature shaft of the motor. The motor shaft extends in a direction parallel with the direction in which the knife-carrier is adjusted on the standard, and the pinion $h^2$ on the motor shaft has a relatively long or broad periphery, thus permitting the adjustment of the knife-carrier and knife without disturbing the mesh of the driving gear wheels.

The construction of the machine as thus far described is not a part of the invention but is described in order that the application of the guard to a machine having an adjustable knife will be fully understood.

I represents the guard which consists of a thin upright plate or shield which is arranged substantially parallel with the rotary knife and at the outer side thereof, that is, the side opposite to that on which the supporting standard is located. The rear edge $i$ of this guard plate is preferably curved to conform substantially to the curvature of the rear edge of the standard B and substantially concentric with the edge of the rotary knife. The space between the rear edges of the standard and the guard is unobstructed and permits the ready escape of dust and lint. The guard plate is removably secured in position preferably by detachably engaging its lower end with the base A adjacent to the lower end of the standard, and detachably or movably securing its upper end to a suitable stationary part of the machine. In the adjustable knife machine shown in Figs. 1 to 9, the upper end of the guard is clamped against a vertical plate or bracket K which is rigidly secured to and projects from the upper portion of the standard B at the side of the knife-carrier F, and the lower end of the guard extends down into the knife slot $f$ in the base and is held rigidly in place by a headed stud $k$ which projects from the lower end of the guard and is seated in a correspondingly shaped socket $k'$ in the base. The upper end of the guard is slotted at $k^2$ to straddle a screw stud $k^3$ projecting from the bracket K and is adapted to be clamped against the face of said bracket by a hand nut $k^4$ screwed on said stud $k^3$.

The guard is placed in position by engaging its slotted upper end with the stud $k^3$ and dropping its lower end into the slots or seats provided therefor in the base, and is rigidly clamped in place against the bracket K by tightening the hand nut $k^4$. The slot $k^2$ is long enough to permit the lower end of the guard to be lifted out of the seats in the base while the upper end is still in engagement with the stud $k^3$, and the lower end of said slot $k^2$ is circular and large enough to receive the cylindrical body of the clamping nut $k^4$. Thus by lifting the guard to disengage its lower end from the base and slipping the circular portion of the slot $k^2$ onto the body of the nut $k^4$ the guard will hang loosely on the nut and can be swung thereon from its operative position at the side of the knife E, so as to permit the ready removal and replacing of the knife. The guard can be completely detached and removed, if desired, by disengaging its slotted upper end from the stud $k^3$ after disengaging its lower end from the base A.

$l$ represents a stud projecting from the guard and serving as a handle therefor.

As the guard is attached to the bracket K projecting from the stationary standard, it does not interfere in any way with the adjustment of the knife-carrier F.

In the machine shown in Figs. 10–15, the knife E' is not adjustable and is journaled on the supporting standard B', being driven from the motor D' by bevel gearing H', shown in Fig. 12. In this construction, as in that above described, the guard I' is secured at its lower end to the base by a projection $m$ on the guard removably seated in a correspondingly shaped socket $m'$ in the base of the machine, and its upper end is secured by a clamp screw N. In this construction, however, the clamp screw N secures the guard to the standard B' on which the screw is mounted. The screw passes through an elongated slot $n$ in the guard which when the screw is loosened permits the guard to be lifted to disengage its lower end from the socket in the base. The guard can be swung upwardly and rearwardly to the position shown in Fig. 12, in which it does not interfere with the removal and replacing of the knife.

O is a hole in the guard in which a pointed implement can be inserted for manipulating the guard.

The guard in both of the constructions described, in conjunction with the standard, covers or incloses the rear portion of the circular knife and effectually prevents the cloth from pressing against the same, as well as protecting the operator's hands from being cut by this portion of the knife. The guard materially increases the efficiency of the machine as it prevents friction due to the pressure of the cloth against the face of the knife at the rear portion thereof, thus enabling the knife to be driven with less power. The guard also prevents the edges of the cloth from being cut or frayed by the rear portion of the knife. Nevertheless, the guard, being readily removable, does not interfere with the ready removal and replacing of the knife.

I claim as my invention:

1. In a cloth cutting machine, the combination of a base, a standard rising therefrom, a rotary knife which is removably mounted at one side of said standard, and a guard which is detachably connected at its lower end to and extends upwardly from said base at the opposite side of the rear portion of said knife opposite the standard and together with the standard guards the rear edge of the knife and prevents the contact of the rear part of the knife with the cloth, said guard being stationarily secured in place but capable of being released and shifted from the normal position at the side of the knife to permit the knife to be removed sidewise from its support.

2. In a cloth cutting machine, the combination of a base, a standard rising therefrom, a rotary knife which is mounted at one side of said standard, an upright guard which is arranged at the opposite side of the knife from said standard, means for detachably interlocking the lower end of said guard to said base, and means for connecting the upper end of said guard to a stationary part of the machine.

3. In a cloth cutting machine, the combination of a base, a standard rising therefrom, a rotary knife which is mounted at one side of said standard, an upright guard which is arranged at the opposite side of the knife from said standard, the lower end of said guard being removably held in a seat in said base, and means for securing the upper end of the guard.

4. In a cloth cutting machine, the combination of a base, a standard rising therefrom, a rotary knife which is mounted at one side of said standard, an upright guard which is arranged at the opposite side of the knife from said standard, the lower end of the guard being removably held in a seat in said base and the upper end of said guard being slotted, and a screw coöperating with the slotted upper end of said guard for clamping the same in place.

5. In a cloth cutting machine, the combination of a base, a standard rising therefrom, a rotary knife which is mounted at one side of said standard, a knife-carrier on which said knife is mounted and which is adjustably supported by said standard for adjusting said knife relative to said base, an upright guard which is arranged at the opposite side of said knife from said standard, a stationary part which extends from said standard beside said adjustable knife-carrier, and means for securing said guard to said stationary part.

6. In a cloth cutting machine, the combination of a base, a standard rising therefrom, a rotary knife which is removably mounted at one side of said standard, a guard which is arranged at the opposite side of the rear portion of said knife opposite the standard and together with the standard guards the rear edge of the knife and prevents the contact of the rear portion of the knife with the cloth, and means for stationarily but releasably securing the guard in place, said guard when released being adapted to be shifted from its normal position at the side of the knife to permit the knife to be removed sidewise from its support, and an opening being provided between the rear edges of said standard and guard to permit the escape of lint.

Witness my hand in the presence of two subscribing witnesses.

FREDERICK J. CLARK.

Witnesses:
C. W. PARKER,
C. B. HORNBECK.

Copies of this patent may be obtained for five cents each, by addressing the "Commissioner of Patents, Washington, D. C."